(12) United States Patent
Sherman

(10) Patent No.: US 11,391,395 B2
(45) Date of Patent: Jul. 19, 2022

(54) PIPE-SUPPORT DEVICE

(71) Applicant: Branson Sherman, Midland, TX (US)

(72) Inventor: Branson Sherman, Midland, TX (US)

( * ) Notice: Subject to any disclaimer, the term of this patent is extended or adjusted under 35 U.S.C. 154(b) by 0 days.

(21) Appl. No.: 17/161,358

(22) Filed: Jan. 28, 2021

(65) Prior Publication Data

US 2021/0285569 A1    Sep. 16, 2021

Related U.S. Application Data

(60) Provisional application No. 62/987,981, filed on Mar. 11, 2020.

(51) Int. Cl.
*F16L 3/02* (2006.01)
*F16L 58/02* (2006.01)

(52) U.S. Cl.
CPC .................. *F16L 3/02* (2013.01); *F16L 58/02* (2013.01)

(58) Field of Classification Search
CPC .................................... F16L 3/02; F16L 58/02
USPC ................ 248/49, 910, 519, 346.02, 346.03; 52/293.2, 299, 607, 686, 687, 665; 108/57.13
See application file for complete search history.

(56) References Cited

U.S. PATENT DOCUMENTS

| | | | | |
|---|---|---|---|---|
| 3,000,144 A | * | 9/1961 | Kitson | E04C 2/205 |
| | | | | 52/309.11 |
| 3,271,913 A | * | 9/1966 | Fields | E04D 13/08 |
| | | | | 52/16 |
| 3,861,158 A | * | 1/1975 | Swain | E02D 27/46 |
| | | | | 405/172 |
| 4,687,185 A | * | 8/1987 | Urano | B22F 3/10 |
| | | | | 266/274 |
| D315,668 S | | 3/1991 | Murphy | |
| 6,345,474 B1 | * | 2/2002 | Triplett | E02D 27/01 |
| | | | | 405/229 |
| 7,441,731 B2 | | 10/2008 | Smart et al. | |
| 8,910,803 B2 | | 12/2014 | Holtby et al. | |

(Continued)

FOREIGN PATENT DOCUMENTS

| CN | 208220190 U | * | 12/2018 |
|---|---|---|---|
| CN | 211066089 U | * | 7/2020 |
| EP | 79865 A1 | * | 5/1983 |

OTHER PUBLICATIONS

Polyurethane and Polyurea Spray Coatings, https://www.armorthane.com/chemical-coatings-products/polyurethane-polyurea-coatings/.

(Continued)

*Primary Examiner* — Kimberly T Wood

(57) ABSTRACT

A pipe-support device is used to retain a pipe in a desired position and orientation. The pipe-support device has a baseplate, a support platform, a set of channels, and a weatherproof coating. The support platform is attached to the baseplate and function as a force distribution system that transfers the weight of the pipe into the baseplate. The channels traverse into a support surface of the support platform. Thus, creating trenches within which the pipe rests. The support platform is constructed from a semirigid material that facilitates retaining the pipe in a desired position. The weatherproof coating is an impermeable liner that isolates the support platform and the baseplate from hazards in the external environment. Thereby, providing a robust device designed to resist damage due to external environmental factors.

14 Claims, 9 Drawing Sheets

(56) References Cited

U.S. PATENT DOCUMENTS

| | | | |
|---|---|---|---|
| 9,556,582 B2 * | 1/2017 | Pelletier | E02D 27/01 |
| 10,609,994 B2 * | 4/2020 | Vanderminden | F16M 13/00 |
| 2002/0189507 A1 * | 12/2002 | Benner | B65D 19/0012 |
| | | | 108/51.3 |
| 2003/0033773 A1 * | 2/2003 | Houpapa | E02D 27/02 |
| | | | 52/299 |
| 2005/0173597 A1 * | 8/2005 | Farrell | F16L 3/22 |
| | | | 248/68.1 |
| 2006/0091265 A1 * | 5/2006 | Smart | F16L 3/02 |
| | | | 248/49 |
| 2012/0260832 A1 * | 10/2012 | Linares | B65D 19/0095 |
| | | | 108/51.3 |

OTHER PUBLICATIONS

Injection Mold, http://www.allrightmachinery.com/injection-mold.html.
Ultra-Line Pipe Tray, https://www.spillcontainment.com/products/line-pipe-tray/.

* cited by examiner

PIPE-SUPPORT DEVICE

The current application claims a priority to the U.S. Provisional Patent application Ser. No. 62/987,981 filed on Mar. 11, 2020.

FIELD OF THE INVENTION

The present invention relates generally to a pipe support. More specifically, a pipe support pad which keeps hydraulic fracturing iron pipes, flow-back iron pipes or any type of pipes off the ground.

BACKGROUND OF THE INVENTION

Traditionally, when assembling a system of large iron piping at a job site, wooden blocks are placed along the length of the iron piping to support and keep the piping off the ground. Typically, the wooden blocks system assembly tends to easily break down under ill-weather conditions, and due to land erosion. Furthermore, the wooden blocks tend to deteriorate faster over time in areas with high levels of rain or humidity.

Therefore, the present invention aims to eliminate the wooden blocks system assembly, by providing an improved solution which requires no assembly, is easily customizable in size, shape and dimension, and provides more resilience, durability, and impermeability than the traditional wooden blocks system assembly approach. The following invention allows for large iron pipes to rest and remain in place despite mechanical vibrations.

Furthermore, the large surface area of the pad allows the piping to remain stable despite being mounted on mud or soft soil. Additionally, the present invention allows for connections to be placed directly on the pad and facilitates easy reconfiguring in case a connection needs to be taken apart. The present invention is designed such that liquid will not leak through, thus maintaining structural integrity. In order to improve impermeability and increase durability of the material, a spray-on polymer coating is applied. Therefore, the present invention provides reliable durability and stability, while maintaining functionality and structure. The simplicity of the design, allows the user to easily utilize the present invention in any related situation, thus leading to an increase in effectiveness and performance. Thus, it is the goal of the present invention to provide the user with a reliable tool, which not only will enhance effectiveness and performance, but it will also result in an increase in efficiency.

SUMMARY OF THE INVENTION

The present invention is an iron pad. More specifically an iron pad which keeps large iron piping systems off the ground and provides better support and an alternative to using the wooden block approach. The iron pad comprises a support platform, a plurality of V-shaped channels, and a central orifice. Furthermore, the preferred embodiment for the present invention comprises a polyethylene closed cell composition foam formula for the support platform. The polyethylene closed cell composition provides the present invention with leak-proof characteristics. Furthermore, the present invention also comprises a polymer spray-on coat. For the preferred embodiment of the present invention, the polymer coating comprises an elastomeric polyurea formula which provides additional impermeability, and durability.

The thickness of the polymer coating can vary, but for the preferred embodiment the surface which comprises the plurality of V-shaped channels, and the opposite surface comprise a thicker layer of polymer coating. Meanwhile, the lateral surfaces comprise half as much layering of polymer coating.

Alternate embodiments may comprise alternative formulas and coatings which still achieve the desired result. The geometric shape for the support platform of the iron pad in the preferred embodiment is a square but could include any geometric shape or variation which still achieves the desired result.

DETAIL DESCRIPTIONS OF THE INVENTION

All illustrations of the drawings are for the purpose of describing selected versions of the present invention and are not intended to limit the scope of the present invention.

Referring to FIG. 1 through FIG. 9, the present invention is a pipe-supporting device that retains a pipe in a desired position. Specifically, the present invention is designed to act as a support platform 2 and standoff that keeps the pipe offset from a surface on which the present invention rests. Preferably, the present invention makes use of a multicomponent platform that is positioned between the pipe and the surface to elevate the pipe while retaining at least one pipe in an orientation that facilitates fluid delivery operations. The term "fluid delivery operations" is used herein to describe pipeline systems used in applications including, but not limited, to hydraulic fracturing (fracking), petrochemical transportation, hydroelectric power, and municipal water supply. As such, the present invention is sheathed in a protective shell that prevents the mount from being damaged when placed within environments containing hazards including, but not limited to, water, corrosive chemicals, and abrasive materials.

Figure 4:
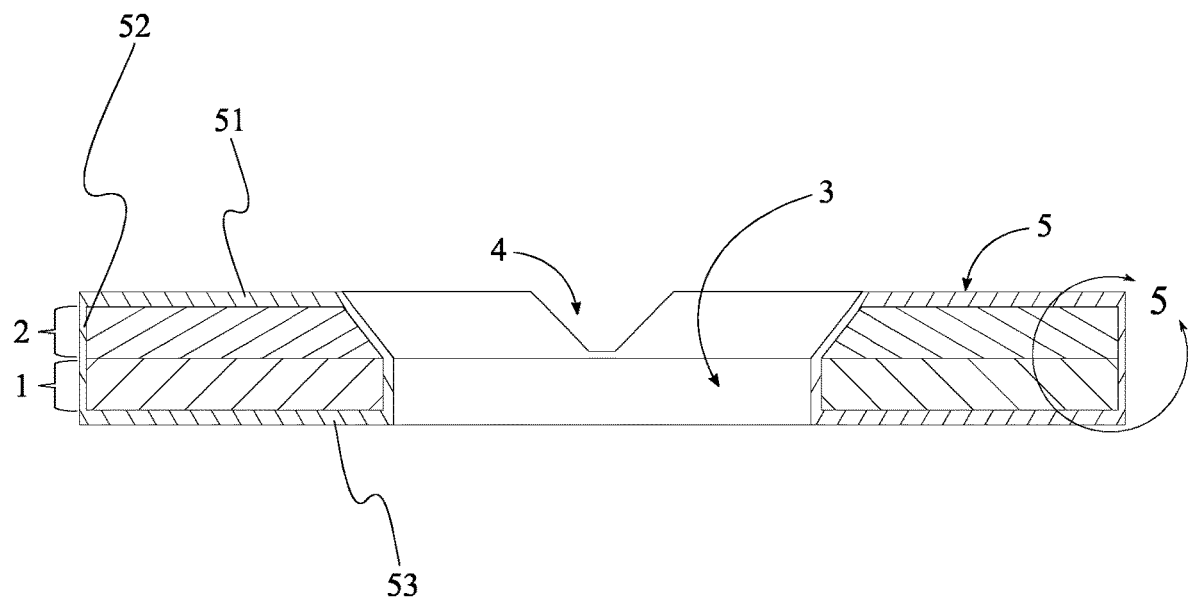
FIG. 4 is a left-side sectional view of the present invention taken along line 4-4 in FIG. 3 this view further indicates magnified area 5.
Figure 5:
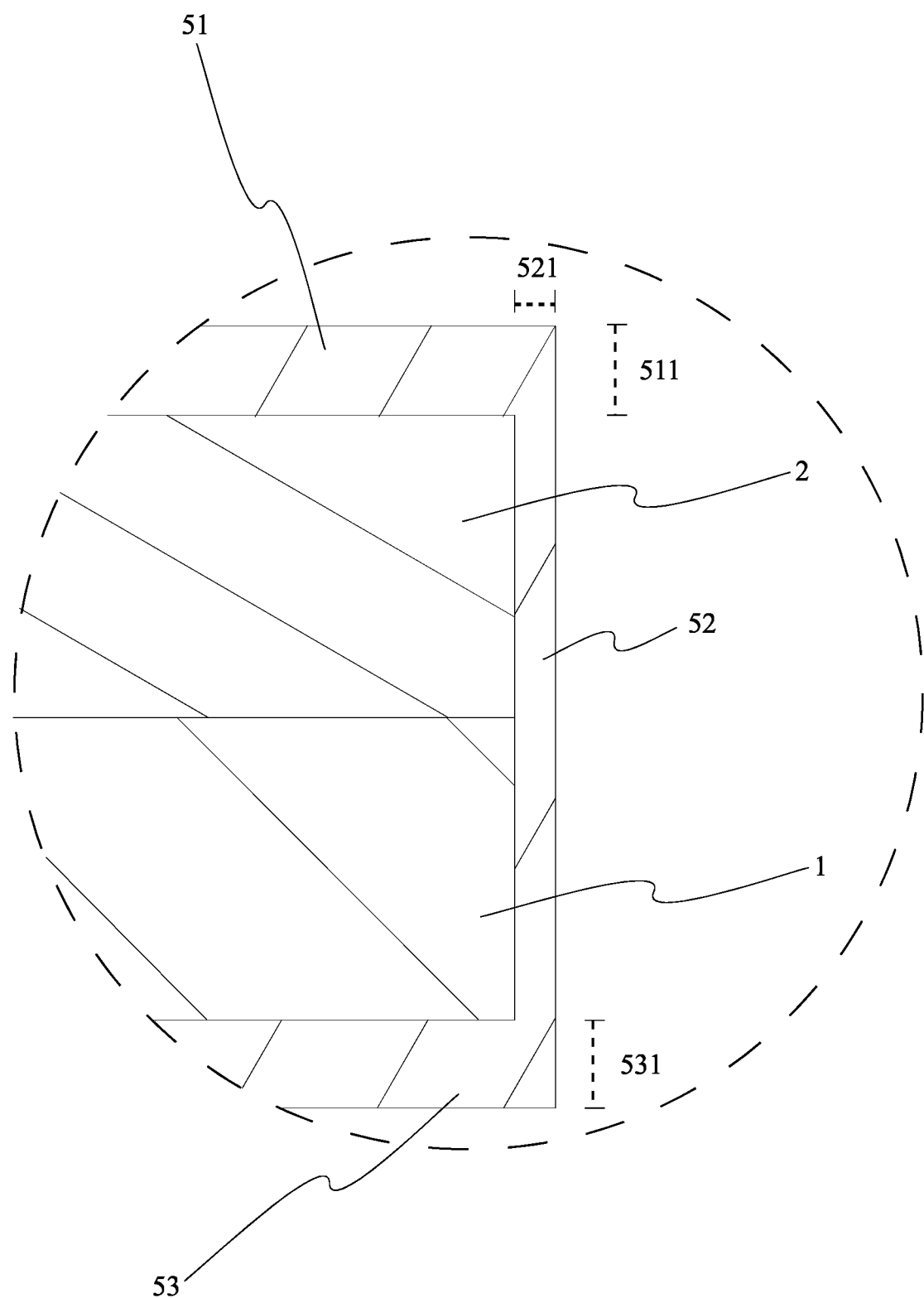
FIG. 5 is a magnified view of the present invention taken within area 5 in FIG. 4.

Referring to FIG. 4 and FIG. 5, to achieve, the above-described functionality, the present invention comprises a baseplate 1, a support platform 2, a plurality of channels 4, and a weatherproof coating 5. The baseplate 1 is constructed from a rigid material that supports and distributes the weight of the pipe over the surface. Embodiments of the present invention include baseplates 1 constructed using materials selected from the group including but not limited to, metals, composites, and ceramics. The support platform 2 is a semirigid structure used to transfer the weight of the pipe into the baseplate 1. Preferably, the support platform 2 is constructed using materials selected from the group including, but not limited to, a polyethylene closed cell composition foam formula, a crossed linked foam, polyurea, silicone, and rubber. The support platform 2 is attached adjacent to the baseplate 1. Accordingly, the support platform 2 serves as a waterproof liner that rests between the baseplate 1 and the pipe. Additionally, the plurality of channels 4 normally traverses into the support platform 2 apposite to the baseplate 1. Thus, creating a receptacle within which a base of the pipe rests. Preferably, the plurality of channels 4 score a pipe-support surface of the support platform 2 to form a structured platform that prevents the pipe from becoming dislodged from or moving off the support platform 2. In some embodiments, the support platform 2 acts as a motion dampener that isolates the pipe from vibrations and movement in the surface on which the present invention rests. The term "weatherproof coating" is used herein to refer to a material coating 5 that is impermeable by liquids, gases, and radiation. As such, the weatherproof coating 5 is superimposed onto the baseplate 1, the support platform 2 and the plurality of channels 4. Therefore, the weatherproof coating 5 prevents hazards in the external environment from damaging the support platform 2 and the baseplate 1. Preferably, the weatherproof coating 5 is manufactured using materials selected from the group including, but not limited to, polymer, paints, plastics, and bitumen.

Referring to FIG. 4 and FIG. 5, the present invention is designed to retain the pipe in a desired position without retaining water from the external environment. As such, the present invention comprises a drainage hole 3 that normally traverses through the support platform 2 and the baseplate 1. Consequently, rainwater does not accumulate on the support platform 2 and drains through the drainage hole 3. Preferably, the weatherproof coating 5 is superimposed onto a plurality of interior walls within the drainage hole 3. In some embodiments, the plurality of interior walls delineates a shape of the drainage hole 3. In supplemental embodiments, the shape of the drainage hole 3 is a frustum that tapers from the support platform 2 toward the baseplate 1.

Figure 1:
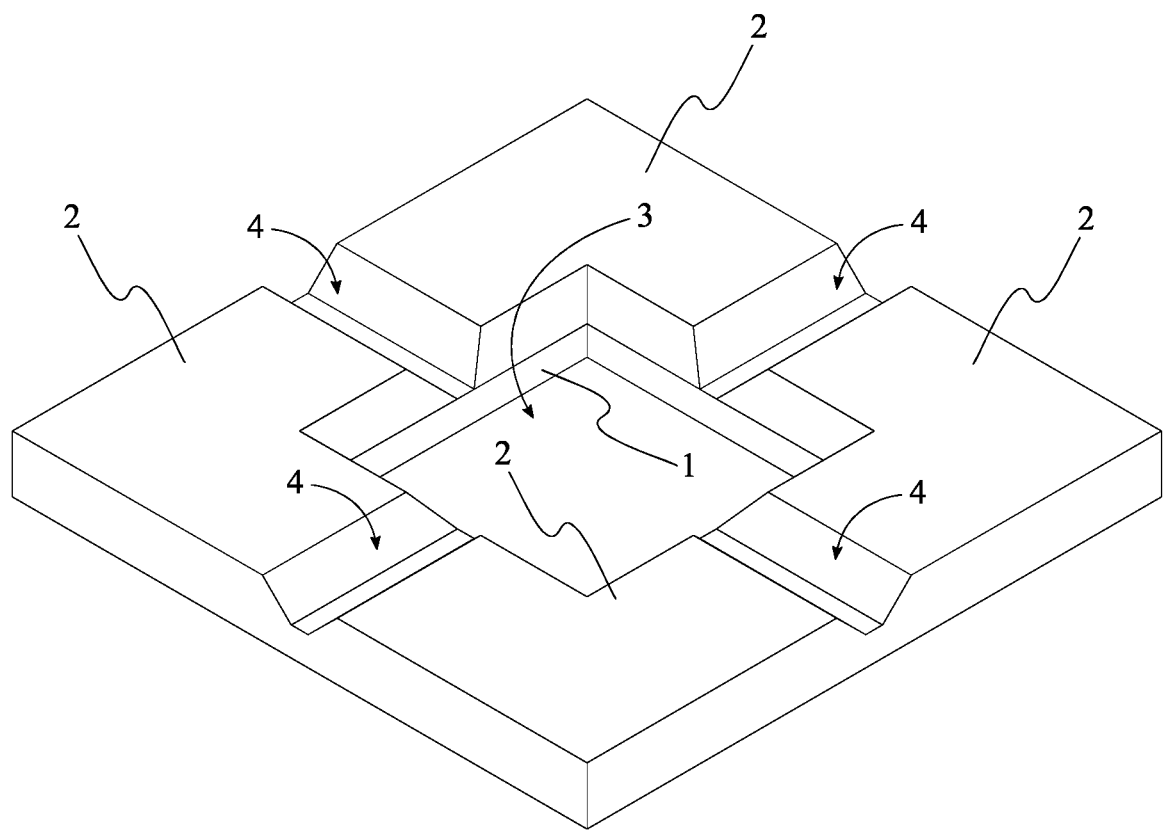
FIG. 1 is a top perspective view of the present invention.
Figure 2:
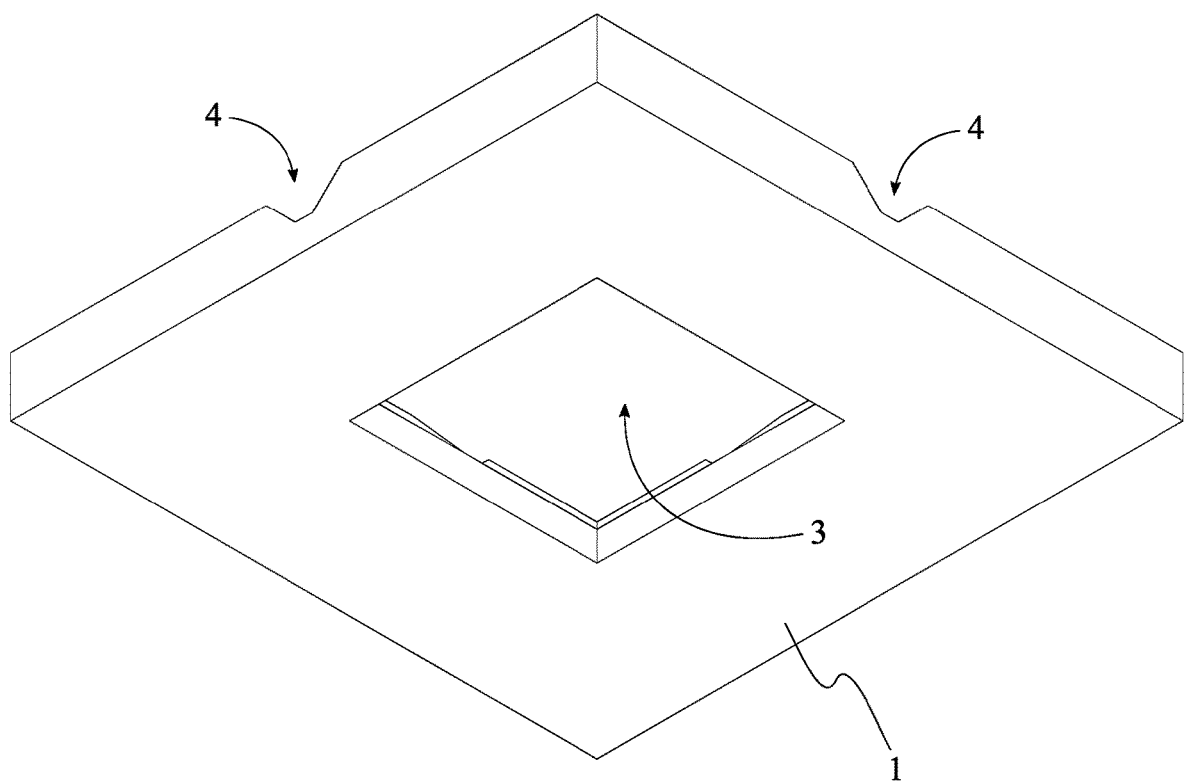
FIG. 2 is a bottom perspective view of the present invention.
Figure 3:
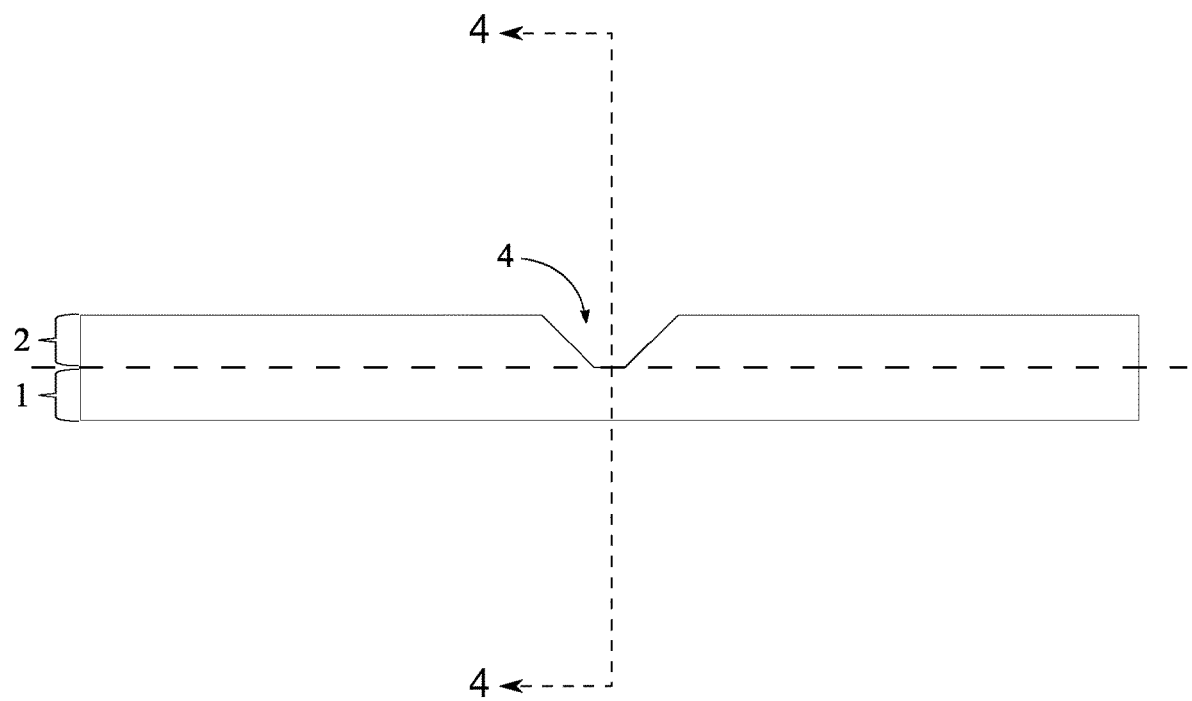
FIG. 3 is a left-side view of the present invention indicating the direction of section cut 4.
Figure 6:
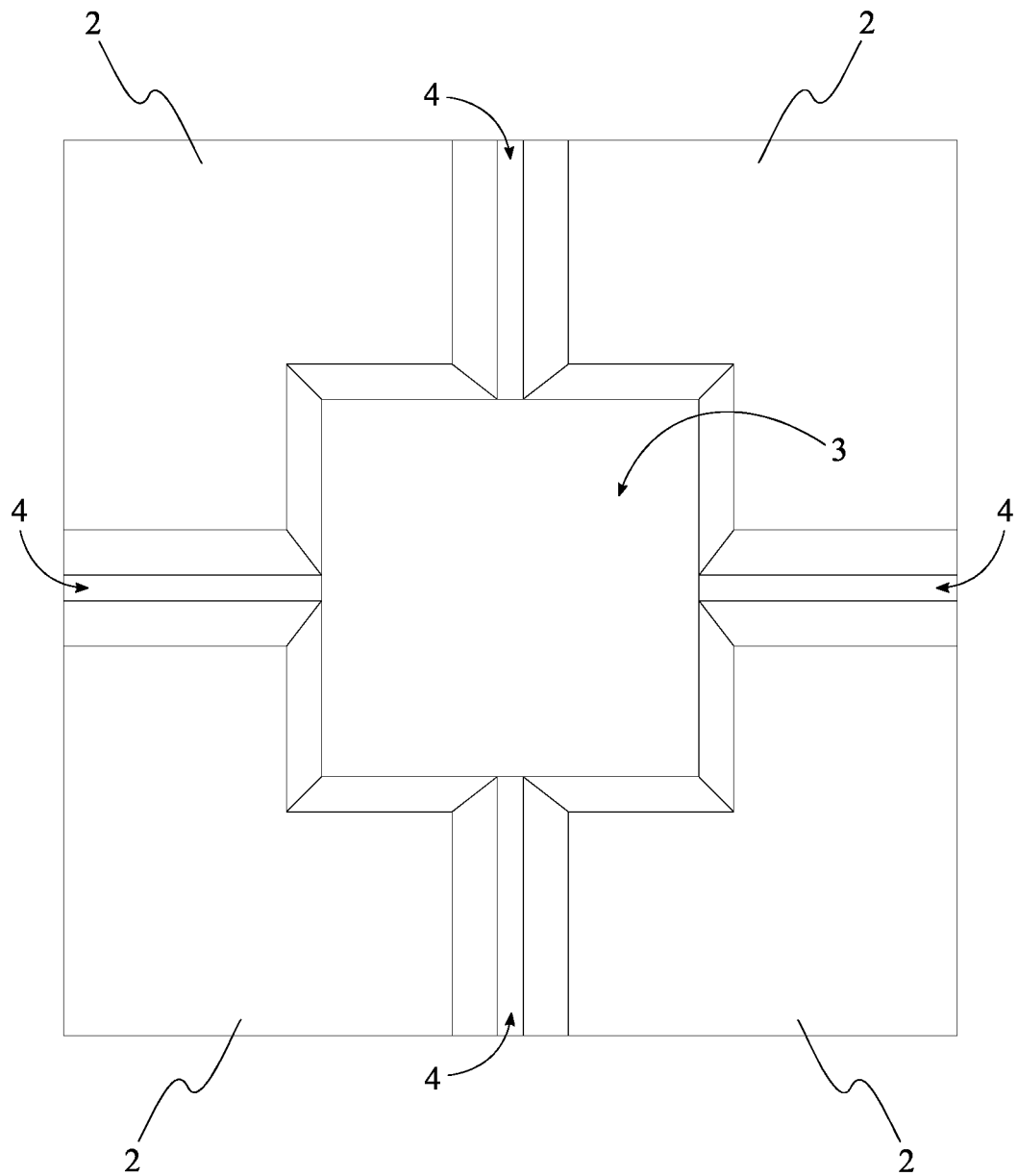
FIG. 6 is a top view of the present invention.
Figure 7:
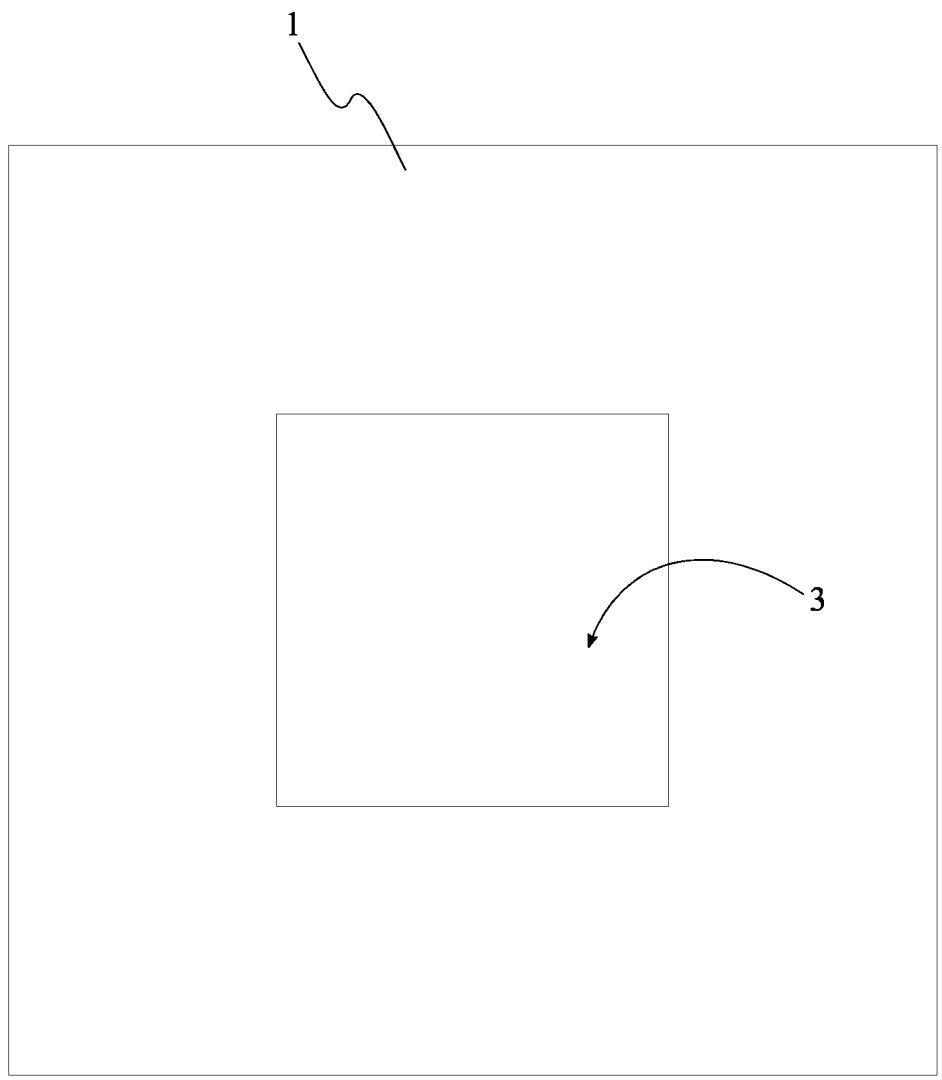
FIG. 7 is a bottom view of the present invention.
Figure 8:
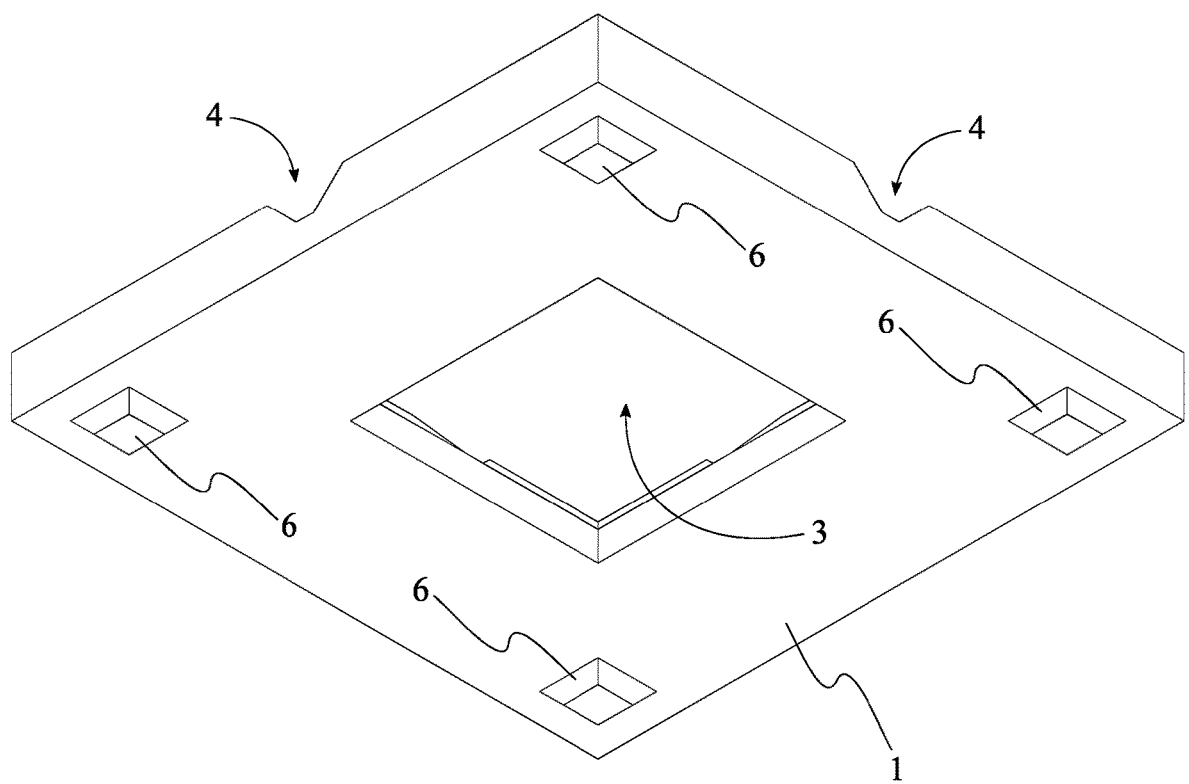
FIG. 8 is a bottom perspective view of an alternative embodiment of the present invention showing a plurality of texturizing elements.
Figure 9:
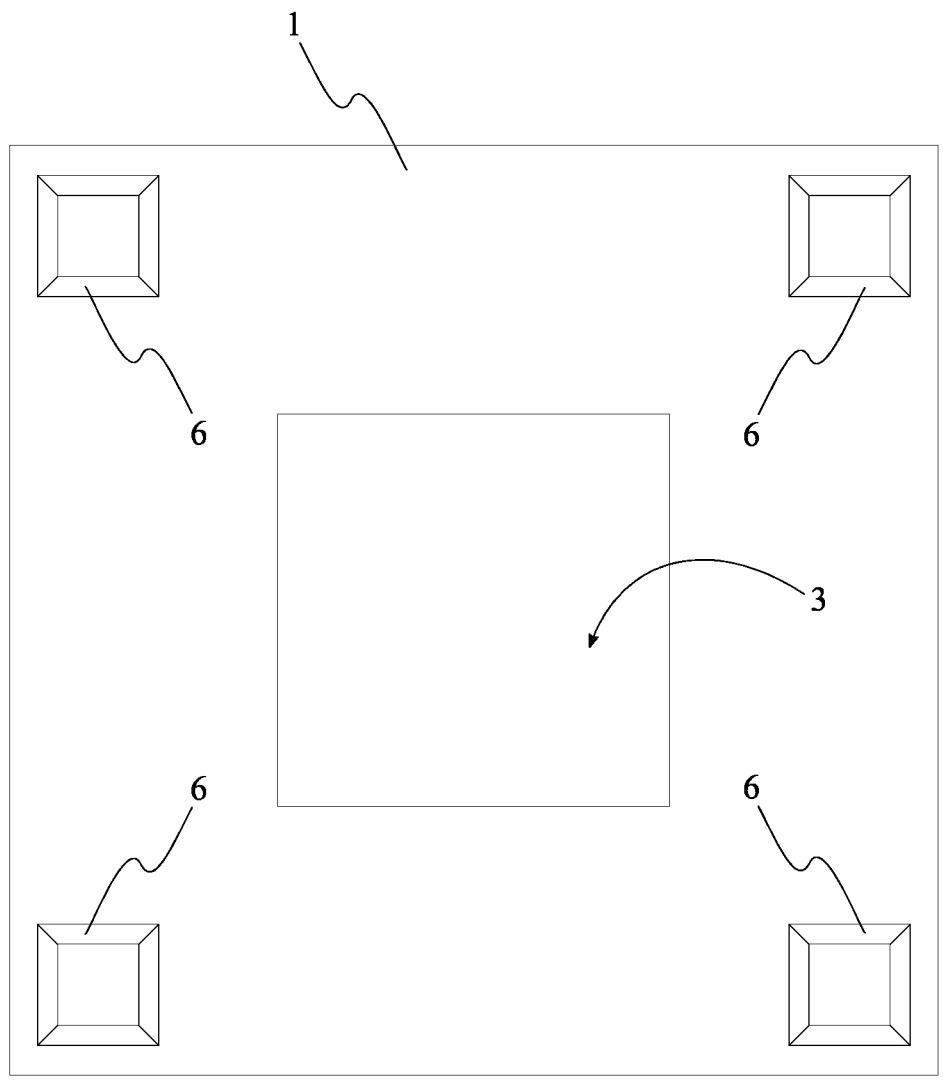
FIG. 9 is a bottom view of an alternative embodiment of the present invention showing a plurality of texturizing elements.

Referring to FIG. 1 and FIG. 6, the present invention is designed to retain the pipe in a desired position relative to the surface on which the baseplate 1 rests. In some embodiments, the plurality of channels 4 is radially distributed across the support platform 2. Thus configured, the present invention is intended to function as an omnidirectional mounting device that is mountable at a plurality of angular offsets relative to the pipe. In some embodiments a pair of channels 4 intersect each other at a center point of the support platform 2. In further embodiments, the plurality of channels 4 is serially distributed across the pipe-support surface of the support platform 2. Thus, enabling the present invention to function as a support system for multiple pipes at once. Further, channels 4 of varying shape and size may be used to mount pipes of varying shape and size. In additional embodiments, a supplemental mounting system is connected in between the pipe and the support platform 2. Thus positioned, the supplemental mounting system enables the pipe to be mechanically coupled to the present invention.

Referring to FIG. 4, FIG. 5, FIG. 8, and FIG. 9, the weatherproof coating 5 is designed to protect the support platform 2 from hazards in the external environment. To achieve this functionality, the weatherproof coating 5 comprises a support portion 51, a sidewall portion 52, and a base portion 53. The support portion 51 is superimposed onto the pipe-support surface and the plurality of channels 4. Thus, protecting the support platform 2 from hazards in the external environment. Likewise, the sidewall portion 52 is laterally superimposed around the baseplate 1 and the support platform 2. Thus, protecting a plurality of lateral sidewalls of the baseplate 1 and the support platform 2 from hazards in the external environment. Further, the base portion 53 is superimposed onto the baseplate 1, opposite to the support platform 2. Thus, protecting the baseplate 1 from hazards in the external environment. The support portion 51, the sidewall portion 52, and the base portion 53 envelop the baseplate 1 and the support platform 2. Thereby, isolating the baseplate 1 and the support platform 2 from the external environment. The various portions of the weatherproof coating 5 have differing thicknesses. In some embodiments, a thickness 511 of the support portion 51 is greater than a thickness 521 of the sidewall portion 52. Similarly, a thickness 531 of the base portion 53 is greater than a thickness 521 of the sidewall portion 52. Accordingly, the weatherproof coating 5 protects the support platform 2 and the baseplate 1 from friction related damage. Preferably the thickness 511 of the support portion 51 and the thickness 531 the base portion 53 is twice as large as the thickness 521 of the sidewall portion 52. In some embodiments, a plurality of texturizing elements 6 is mounted adjacent to the baseplate 1, opposite to the support platform 2. Thus, preventing the present invention from sliding out of place across the surface on which the device rests.

Although the invention has been explained in relation to its preferred embodiment, it is to be understood that many other possible modifications and variations can be made without departing from the spirit and scope of the invention as hereinafter claimed.

What is claimed is:
1. A pipe-support device comprising:
a multicomponent platform;
a plurality of support channels;
a weatherproof coating;
a central orifice;
a plurality of texturizing elements;
the multicomponent platform comprising a baseplate and a support platform;
the support platform being attached adjacent to the baseplate;
wherein the support platform being constructed using a semirigid material;
wherein the baseplate being constructed using a rigid material;
the plurality of channels normally traversing into the support platform;
the plurality of channels being positioned opposite to the baseplate, across the support platform;
the weatherproof coating being superimposed onto the baseplate, the support platform and the plurality of support channels;
the weatherproof coating comprising a support portion, a sidewall portion, and a base portion, the support portion being superimposed onto the support platform and the plurality of channels, the sidewall portion being laterally superimposed around the baseplate and the support platform, and the base portion being superimposed onto the baseplate, opposite to the support platform;
the central orifice normally traversing through the support platform and the baseplate, tapering from the support platform toward the baseplate;
the plurality of texturizing elements being mounted adjacent to the baseplate, opposite to the support platform.

2. The pipe support device as claimed in claim 1, wherein the plurality of channels being radially distributed across the support platform.

3. The pipe support device as claimed in claim 1, wherein the plurality of channels being serially distributed across the support platform.

4. The pipe-support device as claimed in claim 1, wherein the weatherproof coating being a material impermeable by liquids, gases, and radiation.

5. The pipe-support device as claimed in claim 1, wherein the multicomponent platform elevates a pipe relative to the surface on which the baseplate rests.

6. The pipe-support device as claimed in claim 1, wherein the shape of the central orifice is a frustum that tapers from the support platform toward the baseplate.

7. The pipe-support device as claimed in claim 1, wherein a supplemental mounting system is connected in between the pipe and the support platform.

8. The pipe-support device as claimed in claim 1, wherein the thickness of the support portion of the weatherproof coating is ¼ inch thick.

9. The pipe-support device as claimed in claim 1, wherein thickness of the sidewall portion and base portion of the weatherproof coating is ⅛ inch thick.

10. A pipe-support device comprising:
a multicomponent platform;
a plurality of support channels;
a weatherproof coating;
a central orifice;
a plurality of texturizing elements;
the multicomponent platform comprising a baseplate and a support platform,
wherein the multicomponent platform elevates a pipe relative to the surface on which the baseplate rests;
wherein the shape of the central orifice is a frustum that tapers from the support platform toward the baseplate;
the support platform being attached adjacent to the baseplate;
wherein the support platform being constructed using a semirigid material;
wherein the baseplate being constructed using a rigid material;
the plurality of channels normally traversing into the support platform;
the plurality of channels being positioned opposite to the baseplate, across the support platform;
the weatherproof coating being superimposed onto the baseplate, the support platform and the plurality of support channels;
the weatherproof coating comprising a support portion, a sidewall portion, and a base portion, the support portion being superimposed onto the support platform and the plurality of channels, the sidewall portion being laterally superimposed around the baseplate and the support platform, and the base portion being superimposed onto the baseplate, opposite to the support platform;
the central orifice normally traversing through the support platform and the baseplate, tapering from the support platform toward the baseplate;
the plurality of texturizing elements being mounted adjacent to the baseplate, opposite to the support platform.

11. The pipe-support device as claimed in claim 10, wherein the shape of the central orifice is a frustum that tapers from the support platform toward the baseplate.

12. The pipe-support device as claimed in claim 10, wherein a supplemental mounting system is connected in between the pipe and the support platform.

13. The pipe-support device as claimed in claim 10, wherein the thickness of the support portion of the weatherproof coating is ¼ inch thick.

14. The pipe-support device as claimed in claim 10, wherein thickness of the sidewall portion and base portion of the weatherproof coating is ⅛ inch thick.

* * * * *